United States Patent
Flood et al.

(10) Patent No.: US 10,920,064 B2
(45) Date of Patent: Feb. 16, 2021

(54) ULTRAHIGH MELT FLOW STYRENIC BLOCK COPOLYMERS

(71) Applicant: KRATON POLYMERS LLC, Houston, TX (US)

(72) Inventors: John E Flood, Houston, TX (US); Xavier Muyldermans, Mont St. Guibert (BE)

(73) Assignee: Kraton Polymers LLC, Houston, TX (US)

( * ) Notice: Subject to any disclaimer, the term of this patent is extended or adjusted under 35 U.S.C. 154(b) by 82 days.

(21) Appl. No.: 16/360,094

(22) Filed: Mar. 21, 2019

(65) Prior Publication Data
US 2019/0292361 A1 Sep. 26, 2019

Related U.S. Application Data

(60) Provisional application No. 62/647,218, filed on Mar. 23, 2018.

(51) Int. Cl.
| | | |
|---|---|---|
| *C08L 53/02* | (2006.01) | |
| *C08F 297/04* | (2006.01) | |
| *C08L 23/00* | (2006.01) | |
| *C09D 153/02* | (2006.01) | |
| *C09D 123/00* | (2006.01) | |
| *C09J 11/08* | (2006.01) | |
| *C09J 153/02* | (2006.01) | |
| *C09D 11/108* | (2014.01) | |
| *B33Y 70/00* | (2020.01) | |
| *C09J 123/00* | (2006.01) | |
| *C08F 8/04* | (2006.01) | |
| *B33Y 80/00* | (2015.01) | |

(52) U.S. Cl.
CPC ............ *C08L 53/025* (2013.01); *B33Y 70/00* (2014.12); *C08F 8/04* (2013.01); *C08F 297/044* (2013.01); *C08L 23/00* (2013.01); *C09D 11/108* (2013.01); *C09D 123/00* (2013.01); *C09D 153/025* (2013.01); *C09J 11/08* (2013.01); *C09J 123/00* (2013.01); *C09J 153/025* (2013.01); *B33Y 80/00* (2014.12); *C08F 2810/00* (2013.01)

(58) Field of Classification Search
CPC .................................. C08L 53/025; C08F 8/04
See application file for complete search history.

(56) References Cited

U.S. PATENT DOCUMENTS

| | | |
|---|---|---|
| 7,439,301 B2 | 10/2008 | Handlin, Jr. |
| 10,066,098 B2 | 9/2018 | Flood et al. |
| 2005/0196612 A1* | 9/2005 | Flood .................... C08F 297/04 428/364 |
| 2005/0197464 A1 | 9/2005 | Handlin, Jr. et al. |
| 2007/0225428 A1 | 9/2007 | Bening et al. |
| 2008/0039584 A1* | 2/2008 | Bening ................. C08L 53/025 525/88 |
| 2013/0225020 A1 | 8/2013 | Flood et al. |
| 2017/0073513 A1* | 3/2017 | Flood ........................ C08F 8/46 |
| 2017/0275392 A1 | 9/2017 | Flood et al. |

FOREIGN PATENT DOCUMENTS

JP    2016-186049 A    10/2016

* cited by examiner

*Primary Examiner* — Jeffrey C Mullis

(57) ABSTRACT

The disclosure relates to a hydrogenated styrenic block copolymer with high vinyl content, low viscosity, low order-disorder temperature and improved processability. The hydrogenated styrenic block copolymers can be extruded or molded with a minimum of additives. The hydrogenated styrenic block copolymers have high melt flows allowing for ease in processing such as injection molding, overmolding, dipping, extrusion, roto-molding, slush molding, fiber spinning, film making, 3D printing and foaming.

24 Claims, No Drawings

ULTRAHIGH MELT FLOW STYRENIC BLOCK COPOLYMERS

RELATED APPLICATIONS

This application claims priority from U.S. Provisional Application No. 62/647,218, with a filing date of Mar. 23, 2018, the entire disclosures of which is incorporated herein by reference for all purposes.

FIELD

The disclosure relates to hydrogenated block copolymers and articles made thereof.

BACKGROUND

Conventional styrenic block copolymers in the prior art exhibit desirable mechanical properties as required for certain applications, but difficult for processes such as molding, extrusion, 3D printing, and fiber spinning applications, and the like, due to their high viscosity. Therefore, it is a common practice to add substantial amounts of polyolefins, extending oils, tackifying resins and waxes and/or other processing aids to make these block copolymers low viscosity thereby improving their processability. However, additives often lead to inferior elastic properties and cause undesirable processing problems such as smoking and die build-up.

On the other hand, even if some conventional styrenic block copolymers have low viscosity and improved processability, they neither exhibit required mechanical properties nor aid in the preparation of molded and extruded articles.

Therefore, there is a need to produce styrenic block copolymers having the balance of low viscosity, improved elastic properties, and/or isotropic mechanical properties.

SUMMARY

In one aspect, a hydrogenated styrenic block copolymer is disclosed. The selectively hydrogenated block copolymer has an S block and an E or $E_1$ block, and a general formula: S-E-S, $(S-E_1)_nX$, or mixtures thereof, wherein: n has a value of 2 to 6, X is a coupling agent residue, molecular weight of the S block is 4,400 to 5,600 g/mol, a solution viscosity of the block copolymer is less than 80 centipoise (cP), polystyrene content in the block copolymer is 25 to 40 wt. %, up to 50 wt. % of diblock units in the block copolymer with a general formula S-E or $S-E_1$; wherein prior to hydrogenation: the S block is a polystyrene block, the E block is a polydiene block selected from the group consisting of polybutadiene, polyisoprene and mixtures thereof, and having a molecular weight of from 18,000 to 26,000 g/mol, the $E_1$ block is a polydiene block selected from the group consisting of polybutadiene, polyisoprene and mixtures thereof, and having a molecular weight of from 9,000 to 13,000 g/mol, total vinyl content of the polydiene block is 60 to 85%; and wherein subsequent to hydrogenation: 0-10 percent of styrene double bonds in the block copolymer are reduced, and at least 80 percent of conjugated diene double bonds in the block copolymer are reduced.

In another aspect, the present disclosure relates to an article made from composition as described, with the article being selected from films, 3D printed articles, sheets, coating, bands, strips, profile, molding, tubes, foam, tapes, fabric, thread, filaments, ribbons, fibers, and fibrous web, and tires.

In yet another aspect, the article is made by direct extrusion, capable of being used alone or in a laminate structure with a plurality of other layers. In yet another aspect, the article is a transparent, flexible part prepared by any of injection molding, slush molding, rotational molding, compression molding, and dipping.

DESCRIPTION

The following terms will have the following meanings unless otherwise indicated.

"Vinyl content" refers to the content of a conjugated diene that is polymerized via 1,2-addition in the case of butadiene, or via both 1,2-addition and 3,4-addition in case of isoprene.

"Polystyrene content" or PSC of a block copolymer refers to the % weight of polymerized styrene in the block copolymer, calculated by dividing the sum of molecular weight of all polystyrene blocks by the total molecular weight of the block copolymer. PSC can be determined using any suitable methodology such as proton nuclear magnetic resonance (NMR).

"Molecular weight" refers to the peak molecular weight (Mp) in g/mol of the considered polymer measured with GPC using polystyrene calibration standards having known number average molecular weights. Mp is the molecular weight of the standard at the peak maximum.

The order-disorder-transition temperature (ODT) refers to the temperature at which the microdomain structure of the block copolymer begins to disappear. ODT is defined as the temperature above which a zero shear viscosity can be measured by dynamic rheology. ODT temperatures can be measured using dynamic mechanical analysis (DMA), with temperature sweeps performed over various frequencies, wherein the ODT is identified as the temperature where complex viscosity begins to collapse to a single value independent of frequency at low frequencies "Melt index" is a measure of the melt flow of the polymer according ASTM D1238 at 190° C. and 2.16 kg weight, expressed in units of grams of polymer passing through a melt rheometer orifice in 10 minutes.

ASTM D412 refers to the test method to determine the tensile properties of thermoplastic elastomers and vulcanized thermoset rubbers. A dumbbell and straight section specimens or cut ring specimens can be used. For the tests, a Mini D die with a dumbbell central width of 0.1 inch and the length of the narrow parallel sided central portion of 0.5 inch is used to cut the specimens and a 50 mm/min. tensile rate is used.

Block Copolymer Composition:

In one embodiment, the composition comprises a selectively hydrogenated block copolymer having an S block and an E or $E_1$ block and having the general formula: S-E-S, $(S-E_1)_nX$ or mixtures thereof, and n has a value from 2 to 6, or from 2 to 4, or a value of 2. The block copolymer can be linear sequential or coupled having two to six arms. In one embodiment, the hydrogenated block copolymer of formula S-E-S has less than 10 wt. % for a diblock copolymer having the S-E formula, and the block copolymer of formula $(S-E_1)_nX$ has between 5 and 40 wt. % of a diblock copolymer of formula $(S-E_1)$ formula.

Prior to hydrogenation, the S block of the block copolymers can be a polystyrene block having any molecular weight from 4,400 to 5,600.

Prior to hydrogenation, the E block or $E_1$ block is a polydiene block selected from the group consisting of polybutadiene, polyisoprene and mixtures thereof. In one embodiment, the E blocks are a single polydiene block. These polydiene blocks can have molecular weights that range from 18,000 to 26,000. The $E_1$ block is a polydiene block having a molecular weight range of from 9,000 to 13,000.

In one embodiment, the general formula for the linear sequential configurations is S-E-S, where the E block is a polydiene block, selected from the group consisting of polybutadiene, polyisoprene and mixtures thereof, having a molecular weight of from 18,000 to 26,000.

General formulae for the coupled configurations include:

S-$E_1$-X-$E_1$-S and

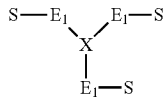

wherein the $E_1$ block is a polydiene block, selected from the group consisting of polybutadiene, polyisoprene and mixtures thereof, having a molecular weight of from 9,000 to 13,000; and X is an alkoxy silane coupling residue.

The block copolymer can be prepared by using a coupling agent that is at least difunctional. A linear coupled block copolymer is made by forming the first S block and E block and then contacting the diblock with a difunctional coupling agent. A radial block copolymer can be prepared by using a coupling agent that is at least trifunctional. An example of difunctional coupling agents is methyl benzoate. Other useful coupling agents useful for forming radial block copolymers include, for example, silicon tetrachloride and alkoxy silanes, polyepoxides, polyisocyanates, polyimines, polyaldehydes, polyketones, polyanhydrides, polyesters, polyhalides, diesters, methoxy silanes, divinyl benzene, 1,3,5-benzenetricarboxylic acid trichloride, glycidoxytrimethoxy silanes, and oxydipropylbis(trimethoxy silane).

In one embodiment, the coupling agent is an alkoxy silane of the general formula $R_x$—Si—$(OR')_y$, where x is 0 or 1, x+y=3 or 4, R and R' are the same or different, R is selected from the group consisting of aryl hydrocarbon radicals, linear alkyl hydrocarbon radicals and branched alkyl hydrocarbon radicals, and R' is selected from linear and branched alkyl hydrocarbon radicals. The aryl radicals preferably have from 6 to 12 carbon atoms. The alkyl radicals preferably have 1 to 12 carbon atoms, more preferably from 1 to 4 carbon atoms. Under melt conditions, these alkoxy silane coupling agents can couple further to yield functionalities greater than 3. Examples of trialkoxy silanes include methyl trimethoxy silane ("MTMS"), methyl triethoxy silane ("MTES"), isobutyl trimethoxy silane ("IBTMO") and phenyl trimethoxy silane ("PhTMO"). Preferred dialkoxy silanes are dimethyl dimethoxy silane ("DMDMS"), dimethyl diethoxy silane ("DMDES") and methyl diethoxy silane ("MDES").

Block Copolymer Preparation:

The block copolymers can be prepared by anionic polymerization of styrene and a diene selected butadiene, isoprene and mixtures thereof. The polymerization is accomplished by contacting the styrene and diene monomers with an organoalkali metal compound in a suitable solvent at a temperature from −150° C. to 300° C., preferably from 0° C. to 100° C. Examples of anionic polymerization initiators include organolithium compounds having the general formula $RLi_n$, where R is an aliphatic, cycloaliphatic, aromatic, or alkyl-substituted aromatic hydrocarbon radical having from 1 to 20 carbon atoms; and n has a value from 1 to 4. Preferred initiators include n-butyl lithium and sec-butyl lithium. Methods for anionic polymerization can be found in U.S. Pat. No. 4,039,593 and U.S. Reissue Pat. No. Re 27,145, incorporated herein by reference.

In one embodiment, linear sequential block copolymers can be made by polymerizing styrene to form a first S block, adding a diene to form an E block, and then adding additional styrene to form a second S block.

In another embodiment, a coupled block copolymer is made by forming the first S block and $E_1$ block and then contacting the diblock with a difunctional or trifunctional coupling agent. The process comprises a coupling reaction between a living polymer having the formula S-$E_1$-Li and the coupling agent as defined above, wherein Li is lithium.

The quantity of coupling agent employed with respect to the quantity of living polymers S-$E_1$-Li present depends largely upon the degree of coupling and the properties of the coupled polymers desired. Preferably, the coupling agent is used in an amount from 0.35 to 0.7 moles of coupling agent per mole of lithium, S-$E_1$-Li; or from 0.4 to 0.55 moles of coupling agent based upon the moles of lithium; or most preferably 0.45 moles of coupling agent per mole of lithium.

The temperature at which the coupling reaction is carried out can vary over a broad range and often is the same as the polymerization temperature, e.g., from 0° to 150° C., from 30° C. to 100° C., or from 55° C. to 80° C.

The coupling reaction is normally carried out by simply mixing the coupling agent, neat or in solution, with the living polymer solution. The reaction period can be quite short, and affected by the mixing rate in the reactor, e.g., from 1 minute to 1 hour. Longer coupling periods may be required at lower temperatures.

After the coupling reaction, the linked polymers may be recovered, or subjected to a selective hydrogenation of the diene portions of the polymer. Hydrogenation generally improves thermal stability, ultraviolet light stability, oxidative stability, and weatherability of the final polymer.

Hydrogenation of Block Copolymer:

In one embodiment, the block copolymer is a hydrogenated block copolymer. The block copolymers can be selectively hydrogenated using a hydrogenation process as disclosed in U.S. Pat. Nos. 3,494,942; 3,634,594; 3,670,054; 3,700,633; and Re. 27,145, incorporated by reference. Any hydrogenation method that is selective for the double bonds in the conjugated polydiene blocks, leaving the aromatic unsaturation in the polystyrene blocks substantially intact, can be used to prepare the hydrogenated block copolymers.

In one embodiment, the method employs a catalyst or catalyst precursor comprising a metal, e.g., nickel or cobalt, and a suitable reducing agent such as an aluminum alkyl. Also useful are titanium based systems. The hydrogenation can be accomplished in a solvent at a temperature from 20° C. to 100° C., and at a hydrogen partial pressure from 100 psig (689 kPa) to 5,000 psig (34,473 kPa). Catalyst concentrations within the range from 10 ppm to 500 ppm by wt. of iron group metal based on total solution are generally used, and contacting at hydrogenation conditions from 60 to 240 minutes. After the hydrogenation is completed, the catalyst and catalyst residue will be separated from the polymer.

The microstructure relevant to the block copolymer can be controlled for a high amount of vinyl in the E and/or $E_1$ blocks, using a control agent known in the art such as to diethyl ether and diethoxypropane during polymerization of the diene, as disclosed in U.S. Pat. No. Re 27,145 and U.S. Pat. No. 5,777,031, incorporated by reference.

Hydrogenation can be carried out under such conditions that at least 80% of the conjugated diene double bonds are reduced, and up to 10% of the arene double bonds are reduced.

The block copolymers are prepared so that they have from 60 to 85% vinyl in the E and/or $E_1$ blocks prior to hydrogenation.

The styrene content of the block copolymer is from 25 wt. % to 40 wt. %. The coupling efficiency is in the range of 50-95% in one embodiment, and at least 80% in a second embodiment. In embodiments, subsequent to hydrogenation, from 0 to 10 percent of the styrene double bonds in the S blocks have been hydrogenated.

Functionalization of Block Copolymer:

In some embodiments, the hydrogenated block copolymer is functionalized to include an additional functional group or moiety. Exemplary monomers to be grafted onto the block copolymers include fumaric acid, itaconic acid, citraconic acid, acrylic acid, maleic anhydride, itaconic anhydride, citraconic anhydride, and their derivatives. The preferred grafting monomer is maleic anhydride.

In one embodiment, the hydrogenated block copolymer is maleated by grafting maleic anhydride onto the block copolymer. Maleation of the block copolymer may be done by in the melt, in solution, or in the solid state, and the process can be either continuous or batch. Various free radical initiators, including peroxides and azo compounds can be used to facilitate the maleation. In some embodiments, the block copolymer contains from 0.1 to 10, preferably 0.2 to 5 percent by weight of grafted monomer.

In one embodiment, the hydrogenated styrenic block copolymer is functionalized via reaction with maleic anhydride. Such functionalized polymers have additional polarity that makes them useful where adhesion to metals or other polar polymers is desired, such as in overmolding, tie layer, adhesive, and coating applications or in compatibilization with certain engineering thermoplastics such as polyamides or epoxy resins for example.

Optional Components:

In applications, the block copolymer compositions can also be admixed with other block copolymers, olefin polymers, styrene polymers, tackifying resins, end block resins, engineering thermoplastic resins, and mixtures thereof.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene and styrene/olefin copolymers. Other polymer examples include polyisobutylene polymers, substantially random ethylene/ styrene or propylene/styrene copolymers, preferably containing at least 20 weight percent copolymerized styrene monomer; styrene-grafted polypropylene polymers; and other block copolymers such as styrene-diene-styrene triblock, radial or star block polymers, styrene-diene diblock polymers, and the hydrogenated versions of these polymers.

Examples of engineering thermoplastic resins include thermoplastic polyester, thermoplastic polyurethane, poly (aryl ether), poly(aryl sulfone), acetal resin, polyamide, nitrile barrier resins, poly(methyl methacrylate), cyclic olefin copolymers, coumarone-indene resin, polyindene resin, poly(methyl indene) resin, polystyrene resin, vinyl-toluene-alphamethylstyrene resin, alphamethylstyrene resin and polyphenylene ether, in particular poly(2,6-dimethyl-1, 4-phenylene ether), and mixtures thereof.

Suitable midblock compatible resins are C5 resin ((cyclopentadiene, cyclopentene, DCPD, piperylene, etc based resin.)hydrogenated C5 resin, hydrogenated C5/C9 resins, hydrogenated C9 resins, terpene resin, rosin ester resin, hydrogenated rosin ester resins or combinations thereof.

In embodiments, the hydrogenated block copolymer is blended with a thermoplastic elastomer or a thermoplastic for use in tire tread formulation as a plasticizer.

In embodiments, the optional polymer is an olefin polymer, e.g., ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. In other embodiments, the polymer is selected from ethylene/acrylic acid (EAA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like.

Additives:

The block copolymer compositions are characterized as having low viscosities and high melt flows that allow them to be easily molded or continuously extruded into shapes or films or spun into fibers. This property allows end users to avoid or at least limit the use of additives that degrade properties, cause area contamination, smoking, and even build-up on molds and dies. While the hydrogenated block copolymers have such low ODTs and high melt indexes that they can be used to prepare articles without using processing aids, it is sometimes desirable to use such aids and other additives. Examples include polymer extending oils, waxes, fillers, reinforcements, lubricants, stabilizers, and mixtures thereof. In embodiments, the additives are selected one or more fillers such as $TiO_2$, $CaCO_3$, carbon black, or other pigments.

In one embodiment, the hydrogenated block copolymer is blended with 0.001 to 10 wt. % of a mineral oil (paraffinic, naphthenic, or aromatic); or from 0.001 to 9 wt. %; 0.001 to 7.5 wt. %; and 0.001 to 5 wt. % of a mineral oil.

Properties of Block Copolymer:

One characteristic of the hydrogenated block copolymers is that they have a low order-disorder temperature (ODT), with the ODT being typically less than 230° C. For ODT above 230° C., the polymer is more difficult to process although in certain instances, ODTs greater than 230° C. can be utilized for some applications, e.g., when the block copolymer is combined with other components to improve processing. Such other components may be thermoplastic polymers, oils, resins, waxes or the like. In embodiments, the ODT is from 150° C. to 230° C.; or from 170° C. to 220° C.; or less than 230° C.

In one embodiment, the hydrogenated block copolymers have a high melt index allowing for easier processing, with a melt index from 80 g/10 min. to 600 g/10 min at 190° C. and 2.16 kg weight.

In embodiments, the hydrogenated block copolymer has a toluene solution viscosity (at 25 wt. % and 25° C.) of greater than 10 cP, or less than 80 CP; or from 15 to 80 cP, or from 20 to 50 cP.

In embodiments, the hydrogenated block copolymer has an elongation at break of at least 300%, or at least 450%.

In embodiments, the hydrogenated block copolymer has a tensile strength of at least 4 MPa; or at least 6 MPa; or 9 MPa or less, as measured on compression molded films according to ASTM D412.

In embodiments, the hydrogenated block copolymers have a hysteresis recovery of greater than 35 percent and a permanent set of less than 35 percent on the first retraction cycle after elongation to 300 percent.

Industrial Applicability:

The hydrogenated block copolymers are useful in a wide variety of applications either as a neat polymer or in a compound. Examples include, for example, toys, medical devices, films, tubing, profiles, 3D printed article, sheet, coating, band, strip, molding, tube, foam, tape, fabric, thread, filament, ribbon, fiber, plurality of fibers and fibrous web, overmolding applications for automotive parts, dipped goods such as gloves, thermoset applications such as in sheet molding compounds or bulk molding compounds for trays, hot melt adhesives, tie-layer for functionalized polymers, asphalt formulations, roofing sheets, geomembrane applications. The article can be formed in a process including injection molding, overmolding, dipping, extrusion, rotomolding, slush molding, fiber spinning, film making, 3D printing and foaming. In embodiments, the hydrogenated block copolymers are added to rubber compositions for the use of making tire treads or inner layers.

In embodiments, the hydrogenated block copolymers are for use in making web layers for the construction of an adsorbent personal hygiene product such as a baby diaper article, adult incontinence article, or feminine napkin article. In applications such as melt blown articles, the composition may contain an additional component of high flow polyolefin having a melt flow rate >40 g/10 min., polyisobutylene, polybutene, thermoplastic polyurethane, thermoplastic copolyester, oil, styrenic block copolymer with melt flow rate <100 g/10 min., and/or mid-block or end block resin.

In embodiments, the hydrogenated block copolymers are used as an additive, e.g., as a plasticizer, to thermoplastic compositions or thermoplastic elastomers in amount ranging from 0.1 to 90 wt. %; or from 0.5 to 70 wt %, or 1 to 50 wt. %, or 5-35 wt. % based on the total weight of the thermoplastic or thermoplastic elastomer composition.

In embodiments, the hydrogenated block copolymers are for use in adhesive formulations, e.g., a personal hygiene construction adhesive, elastic attachment adhesive, and hotmelt adhesive. The formulations could comprise a blend such as 0 to about 80 wt. % poly-alpha-olefin, 10 to about 60 wt. of a tackifying resin, and 10 to about 50 wt. % of the hydrogenated block copolymer. Examples of tackifying resins include C5 resin (cyclopentadiene, cyclopentene, DCPD, piperylene, etc based resin.), hydrogenated C5 resin, hydrogenated C5/C9 resins, hydrogenated C9 resins, terpene resin, rosin ester resin, hydrogenated rosin ester resins, or combinations thereof

EXAMPLES

The following examples are provided to illustrate the disclosure.

Example 1

A hydrogenated block copolymer is prepared by anionic polymerization of styrene and then butadiene in the presence of a microstructure control agent followed by coupling and then hydrogenation: a diblock polymer anion, S-$E_1$-Li, is prepared by charging 6 L of cyclohexane and 342 g of styrene to a reactor. The reactor temperature set temperature was 50° C. Impurities were removed by adding small aliquots of s-butyllithium until the first evidence of color. 198 milliliters of a solution of an approximately 12 wt. % solution of s-butyllithium in cyclohexane was added, and the styrene was allowed to complete polymerization. The molecular weight of the polystyrene produced in this reaction was determined to be 5,300 g/mol by GPC. 10 ml of 1,2-diethoxypropane were added, and then 715 g of butadiene were added at rates to allow the temperature to remain 60° C. A sample collected at the end of the butadiene polymerization had a styrene content of 36.5 wt. % and a vinyl content of 79% basis $^1$H NMR and an overall molecular weight of approximately 34,000 g/mol as determined by GPC. Following polymerization of the majority of the butadiene, and then 5.1 ml of MTMS was added, and the coupling reaction was allowed to proceed for 60 minutes at 60° C. 1.5 ml of 2-ethyl hexanol was added to terminate the reaction. The final product had a coupling efficiency of 92% and 72% of the coupled species were linear with the remaining 28 percent being 3-arm radial.

A sample of the polymer was hydrogenated to a residual olefin concentration of at least 0.15 meq/g in the presence of a solution of cobalt neodecanoate-aluminum triethyl catalyst (Al/Co=1.7 mol/mol). The catalyst was removed by washing with aqueous phosphoric acid, and the polymer was recovered via steam stripping, under conditions typical for hydrogenated polymers.

The partially hydrogenated block copolymer was tested for composition, solution viscosity, and ODT. The results are in Table 1. The hydrogenated block copolymer was also tested for mechanical properties and melt index. The results are in Table 2.

Example 2

A hydrogenated block copolymer is prepared by anionic polymerization of styrene and then butadiene in the presence of a microstructure control agent followed by coupling and then hydrogenation: a diblock polymer anion, S-$E_1$-Li, is prepared by charging 6 L of cyclohexane and 300 g, of styrene to a reactor. The reactor temperature was increased to 50° C. Impurities were removed by adding small aliquots of s-butyllithium until the first evidence of color. 198 milliliters of a solution of an approximately 12% wt solution of s-butyllithium in cyclohexane was added, and the styrene was allowed to complete polymerization at 60° C. The molecular weight of the polystyrene produced in this reaction was determined to be 4,900 g/mol by GPC. 8 ml. of 1,2-diethoxypropane were added, and then 720 g of butadiene were added at rates to allow the temperature to remain 60° C. A sample collected at the end of the butadiene polymerization had a styrene content of 32.4% wt and a vinyl content of 79% basis $^1$H NMR and an overall molecular weight of approximately 34,000 g/mol. Following polymerization of the butadiene, 4.5 ml of DMDMS was added, and the coupling reaction was allowed to proceed for 60 minutes at 60° C. 1.7 ml of 2-ethyl hexanol was added to terminate the reaction. The final product had a coupling efficiency of 87% and 100% of the coupled polymer was linear.

The polymer was hydrogenated to a residual olefin concentration of at least 0.15 meq/g in the presence of Co in a solution of cobalt neodecanoate-aluminum triethyl catalyst (Al/Co=1.7 mol/mol). The catalyst was removed by washing with aqueous phosphoric acid. The polymer was recovered via steam stripping.

The partially hydrogenated block copolymer was tested for polymer composition, solution viscosity, and ODT. The results are in Table 1. The hydrogenated block copolymer was also tested for mechanical properties and melt index. The results are in Table 2.

Example 3

A partially hydrogenated block copolymer is prepared by anionic polymerization of styrene and then butadiene in the presence of a microstructure control agent followed by coupling and then hydrogenation: a diblock polymer anion, S-E$_1$-Li, is prepared by charging 6 L of cyclohexane and 321 g, of styrene to a reactor. The reactor temperature was increased to 50° C. Impurities were removed by adding small aliquots of s-butyllithium until the first evidence of color. 198 ml of a solution of an approximately 12% wt solution of s-butyllithium in cyclohexane was added, and the styrene was allowed to complete polymerization at 60° C. The molecular weight of the polystyrene produced in this reaction was determined to be 4,900 by GPC. 10 ml. of 1,2-diethoxypropane were added, and then 638 g of butadiene were added at rates to allow the temperature to remain 60° C. A sample collected at the end of the butadiene polymerization had a styrene content of 35% wt and a vinyl content of 76% basis $^1$H NMR and an overall molecular weight of 34,000 g/mol. After polymerization of the butadiene, 3.6 ml of DMDMS was added, and the coupling reaction was allowed to proceed for 60 minutes at 60° C. 2 ml of 2-ethyl hexanol 8.5 g, 0.1 mol per mol of Li) was added to terminate the reaction. The final product had a coupling efficiency of 76% and 100% of the coupled species were linear.

The polymer was hydrogenated to a residual olefin concentration of less than 0.15 meq/g in the presence of Co of a solution of cobalt neodecanoate-aluminum triethyl catalyst (Al/Co=1.7 mol/mol). The catalyst was removed by washing with aqueous phosphoric acid, and the polymer was recovered via steam stripping. The partially hydrogenated block copolymer was tested for polymer composition, solution viscosity, and ODT. The results are in Table 1. The hydrogenated block copolymer was also tested for mechanical properties and melt index. The results are in Table 2.

Example 4

A partially hydrogenated block copolymer is prepared by anionic polymerization of styrene followed by butadiene in the presence of a microstructure control agent and then styrene again. The resulting polymer is a linear triblock with 29% polystyrene; refer to Table 1 for details.

The polymer was hydrogenated to a residual olefin concentration of less than 0.15 meq/g in the presence of Co of a solution of cobalt neodecanoate-aluminum triethyl catalyst (Al/Co=1.7 mol/mol). The catalyst was removed by washing with aqueous phosphoric acid, and the polymer was recovered via steam stripping. The partially hydrogenated block copolymer was tested for polymer composition, solution viscosity, and ODT. Results of the test are in Table 1. The hydrogenated block copolymer was tested for mechanical properties and melt index. The results are in Table 2.

Table 1 lists the styrene block molecular weight, diene block molecular weight, coupling efficiency, polystyrene concentration, vinyl concentration, solution viscosity, and ODT for various examples. The block copolymers were tested for Brookfield viscosity and ODT was measured using a Bohlin VOR rheometer.

TABLE 1

Polymer Composition, Solution Viscosity and ODT

| Polymer | Styrene Block MW (g/mol) | Diene Block MW (g/mol) | Coupling Efficiency (wt %) | Polystyrene Content (wt %) | Vinyl Amount (wt %) | Solution Viscosity (cP) | ODT (° C.) |
|---|---|---|---|---|---|---|---|
| Example 1 | 5,200 | E1 = 11,500 | 92 | 36.5 | 79 | 23 | 170 |
| Example 2 | 4,900 | E1 = 12,000 | 87 | 32.4 | 79 | 25 | 170 |
| Example 3 | 4,900 | E1 = 12,000 | 76 | 35 | 76 | 21 | 170 |
| Example 4 | 4.500 & 5.500 | E = 23,500 | — | 29 | 76 | 42 | 220 |
| Comp. Example 5 | 5,000 | E1 = 20,000 | 90 | 20 | 78 | 92 | 170 |
| Comp. Example 6 | 5,600 | E1 = 13,000 | 90 | 30 | 38 | 583 | 250 |

The 100% modulus, tensile strength, elongation to break and melt flow for various examples and comparative examples are in Table 2. Tensile properties were measured on compression molded film samples according ASTM D412. A Mini D die was used to cut the specimens and a 50 mm/min. tensile rate was used. Partially hydrogenated block copolymers of comparative examples 1 and 2 were prepared and tested. Comparative example 5 is a 20 wt. % styrene, high vinyl SEBS block copolymer that is a considered to be one of the lowest viscosity block polymers commercially available; refer to Table 1 and 2 for details. However, relative to comparative example 5, examples 1-4 are significantly lower viscosity than comparative example 1; see the solution viscosity in Table 1 and the melt index in Table 2.

In addition, even though they are low molecular weight compared to comparative example 5, examples 1-4 have reasonable modulus, elongation to break and tensile strength; refer to Table 2. Likewise, with similar molecular weights to comparative example 6 (Table 1), examples 1-4 are significantly lower viscosity due to the higher vinyl concentration. Vinyl significantly shortens the polymer chain and hence reduces the viscosity. Vinyl reduces the number of chain entanglements for a given molecular weight and lowers the tensile strength. However, the ODT was significantly, and unexpectedly lower, for examples 1-4 compared to comparative example 6, even though the polystyrene concentrations for examples 1-4 are equal or higher than comparative example 2. A lower ODT improves processability (reduced pressure, higher throughput rates, etc.) at normal polymer processing temperatures (200 to 250 C).

TABLE 2

Mechanical Properties and Melt Index (MI)

| Polymer | 100% Modulus (MPa) | Elongation to Break (%) | Tensile Strength (MPa) | MI at 190° C. and 2.16 kg (g/10 min.) |
|---|---|---|---|---|
| Example 1 | 2.4 | 510 | 8.3 | 240 |
| Example 2 | 2.3 | 500 | 6.3 | 388 |
| Example 3 | 1.9 | 520 | 5.7 | 464 |
| Example 4 | 2.7 | 450 | 6.9 | 90 |
| Comparative Example 5 | 1.2 | 780 | 10.3 | 38 |
| Comparative Example 6 | 2.7 | 560 | 39.3 | 3.4 |

Unless defined otherwise, all technical and scientific terms used herein have the same meanings as commonly understood by one with skill in the art to which the disclosed disclosure belongs. As used herein, the term "comprising" and variations thereof as used herein is used synonymously with the term "including" and variations thereof and are open, non-limiting terms, meaning including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

Embodiment 1

A selectively hydrogenated block copolymer having an S block and an E or $E_1$ block and having a general formula: S-E-S, $(S-E_1)_nX$, or mixtures thereof, wherein: n has a value of 2 to 6; X is a coupling agent residue; molecular weight of the S block is 4,400 to 5,600 g/mol; a solution viscosity of the block copolymer is less than 80 centipoise (cP); polystyrene content in the block copolymer is 25 to 40 wt. %; up to 50 wt. % of diblock units in the block copolymer with a general formula S-E or S-$E_1$; wherein prior to hydrogenation: the S block is a polystyrene block; the E block is a polydiene block selected from the group consisting of polybutadiene, polyisoprene and mixtures thereof, and having a molecular weight of from 18,000 to 26,000 g/mol; the $E_1$ block is a polydiene block selected from the group consisting of polybutadiene, polyisoprene and mixtures thereof, and having a molecular weight of from 9,000 to 13,000 g/mol; total vinyl content of the polydiene block is 60 to 85%; and wherein subsequent to hydrogenation: 0-10 percent of styrene double bonds in the block copolymer are reduced, and at least 80 percent of conjugated diene double bonds in the block copolymer are reduced.

Embodiment 2

The block copolymer of Embodiment 1, wherein the block copolymer has an order-disorder temperature (ODT) of less than 230° C.

Embodiment 3

The block copolymer of Embodiment 1, wherein the block copolymer has a formula S-E-S, with less than 10 wt. % of a diblock copolymer of formula S-E.

Embodiment 4

The block copolymer of Embodiment 1, wherein the block copolymer has a formula $(S-E_1)_nX$, with between 5 and 50 wt. % of a diblock copolymer of formula S-$E_1$.

Embodiment 5

The block copolymer of Embodiment 1, wherein the coupling agent is selected from the group of methyl benzoate, silicon tetrachloride, alkoxy silanes, polyepoxides, polyisocyanates, polyimines, polyaldehydes, polyketones, polyanhydrides, polyesters, polyhalides, diesters, methoxy silanes, divinyl benzene, 1,3,5-benzenetricarboxylic acid trichloride, glycidoxytrimethoxy silanes, oxydipropylbis(trimethoxy silane), and mixtures thereof.

Embodiment 6

The block copolymer of Embodiment 1, wherein the block copolymer has a formula of S-E-S, and a solution viscosity ranging from 10 cP to 80 cP.

Embodiment 7

The block copolymer of Embodiment 1, wherein the block copolymer has a formula of $(S-E_1)_nX$, and a solution viscosity ranging from 10 to 50 cP.

Embodiment 8

The block copolymer of Embodiment 1, wherein the block copolymer has a melt index from 80 to 600 g/10 min. at 190° C. and 2.16 kg weight.

Embodiment 9

The block copolymer of Embodiment 1, wherein the block copolymer has an elongation at break of at least 300%.

Embodiment 10

The block copolymer of Embodiment 1, wherein the block copolymer has a tensile strength of at least 4 MPa.

Embodiment 11

The block copolymer of Embodiment 1, wherein the block copolymer is functionalized with a functional group selected from fumaric acid, itaconic acid, citraconic acid, acrylic acid, maleic anhydride, itaconic anhydride, citraconic anhydride, and their derivatives and derivatives thereof.

Embodiment 12

The block copolymer of Embodiment 11, wherein the block copolymer is functionalized by grafting maleic anhydride onto the block copolymer.

Embodiment 13

An adhesive composition comprising: 0 to about 80 wt. % of a poly-alpha-olefin; 10 to about 60 wt. of a tackifying resin, and 10 to about 50 wt. % of the hydrogenated block copolymer of Embodiment 1.

Embodiment 14

A composition comprising: the selectively hydrogenated block copolymer of Embodiment 1; 0.001 to 90 wt. % of an additive selected from olefin polymers, thermoplastic polyurethane, thermoplastic copolyester, styrene polymers, thermoplastic elastomers, tackifying resins, polymer extending oil, waxes, fillers, lubricants, stabilizers, engineering thermoplastic resins, and mixtures thereof.

Embodiment 15

The composition of Embodiment 14, wherein the additive is a high flow polyolefin having a melt flow rate of >40 g/10 min.

Embodiment 16

The composition of Embodiment 14, wherein the selectively hydrogenated block copolymer has an order-disorder temperature (ODT) of 140-230° C.

Embodiment 17

An article comprising the composition of Embodiment 14, wherein the article is selected from the group of toys, medical devices, films, tubing, profiles, 3D printed article, sheet, coating, band, strip, molding, tube, foam, tape, fabric, thread, filament, ribbon, fibers, fibrous web, overmolded automotive parts, dipped goods, sheet molded articles, hot melt adhesives, tie-layers, roofing sheets, membranes, tire treads, and tire inner layers.

Embodiment 18

The article of Embodiment 17, wherein the article is formed by injection molding, overmolding, dipping, extrusion, roto-molding, slush molding, fiber spinning, film making, 3D printing or foaming.

Embodiment 19

A composition comprising: a selectively hydrogenated block copolymer having an S block and an E or $E_1$ block and having the general formula S-E-S, $(S-E_1)_nX$ or mixtures thereof, wherein: n has a value of 2 to 6, X is a coupling agent residue, styrene content of the block copolymer is 29 to 37 wt. %, a viscosity in the range of 10 to 80 centipoise (cP); wherein prior to hydrogenation: the S block is a polystyrene block, the E block is a polydiene block, selected from the group consisting of polybutadiene, polyisoprene and mixtures thereof, having a molecular weight of from 18,000 to 26,000 g/mol, the $E_1$ block is a polydiene block, selected from the group consisting of polybutadiene, polyisoprene and mixtures thereof, having a molecular weight of from 9,000 to 13,000 g/mol, total vinyl content of the polydiene blocks is 70 to 85%; wherein subsequent to hydrogenation: 0-10 percent of the styrene double bonds have been hydrogenated; and wherein the block copolymer contains from 0.1 to 10 wt. % of a functional group selected from fumaric acid, itaconic acid, citraconic acid, acrylic acid, maleic anhydride, itaconic anhydride, citraconic anhydride, and their derivatives and derivatives thereof as a grafted monomer.

Embodiment 20

The composition of Embodiment 19, wherein the selectively hydrogenated block copolymer has an order-disorder temperature (ODT) of less than 230° C.

The invention claimed is:

1. A selectively hydrogenated block copolymer having an S block and an E or $E_1$ block and having a general formula: S-E-S, $(S-E_1)_nX$, or mixtures thereof,
   wherein:
   n has a value of 2 to 6;
   X is a coupling agent residue;
   the S block has a peak molecular weight of 4,400 to 5,600 g/mol;
   the block copolymer has a solution viscosity of less than 80 centipoise (cP) as measured at 25 wt. % toluene and 25° C.;
   the block copolymer has a polystyrene content of 25 to 40 wt. %; and
   up to 50 wt. % of diblock units in the block copolymer have a general formula S-E or $S-E_1$,
   wherein prior to hydrogenation:
   the S block is a polystyrene block;
   the E block is a polydiene block selected from the group consisting of polybutadiene, polyisoprene and mixtures thereof, and having a peak molecular weight of from 18,000 to 26,000 g/mol;
   the $E_1$ block is a polydiene block selected from the group consisting of polybutadiene, polyisoprene and mixtures thereof, and having a peak molecular weight of from 9,000 to 13,000 g/mol;

the polydiene block has a total vinyl content of 60 to 85%; and wherein subsequent to hydrogenation:
0-10 percent of styrene double bonds in the block copolymer are reduced, and
at least 80 percent of conjugated diene double bonds in the block copolymer are reduced.

2. The block copolymer of claim 1, wherein the block copolymer has an order-disorder temperature (ODT) of less than 230° C.

3. The block copolymer of claim 1, wherein the block copolymer has a formula S-E-S, with less than 10 wt. % of a diblock copolymer of formula S-E.

4. The block copolymer of claim 1, wherein the block copolymer has a formula $(S-E_1)_nX$, with between 5 and 50 wt. % of a diblock copolymer of formula $S-E_1$.

5. The block copolymer of claim 1, wherein the coupling agent is selected from the group of methyl benzoate, silicon tetrachloride, alkoxy silanes, polyepoxides, polyisocyanates, polyimines, polyaldehydes, polyketones, polyanhydrides, polyesters, polyhalides, diesters, methoxy silanes, divinyl benzene, 1,3,5-benzenetricarboxylic acid trichloride, glycidoxytrimethoxy silanes, oxydipropylbis(trimethoxy silane), and mixtures thereof.

6. The block copolymer of claim 1, wherein the block copolymer has a formula of S-E-S, and a solution viscosity ranging from 10 cP to 80 cP.

7. The block copolymer of claim 1, wherein the block copolymer has a formula of $(S-E_1)_nX$, and a solution viscosity ranging from 10 to 50 cP.

8. The block copolymer of claim 1, wherein the block copolymer has a melt index from 80 to 600 g/10 min. at 190° C. and 2.16 kg weight.

9. The block copolymer of claim 1 wherein the block copolymer has an elongation at break of at least 300%.

10. The block copolymer of claim 1 wherein the block copolymer has a tensile strength of at least 4 MPa.

11. The block copolymer of claim 1 wherein the block copolymer is functionalized with a functional group selected from fumaric acid, itaconic acid, citraconic acid, acrylic acid, maleic anhydride, itaconic anhydride, citraconic anhydride, and their derivatives and derivatives thereof.

12. The block copolymer of claim 11, wherein the block copolymer is functionalized by grafting maleic anhydride onto the block copolymer.

13. An adhesive composition comprising:
0 to about 80 wt. % of a poly-alpha-olefin
10 to about 60 wt. % of a tackifying resin, and
10 to about 50 wt. % of the hydrogenated block copolymer of claim 1.

14. A composition comprising:
the selectively hydrogenated block copolymer of claim 1;
0.001 to 90 wt. % of an additive selected from olefin polymers, thermoplastic polyurethane, thermoplastic copolyester, styrene polymers, thermoplastic elastomers, tackifying resins, polymer extending oil, waxes, fillers, lubricants, stabilizers, engineering thermoplastic resins, and mixtures thereof.

15. The composition of claim 14, wherein the additive is a high flow polyolefin having a melt flow rate of >40 g/10 min, according to ASTM D1238 at 190° C. and 2.16 kg weight.

16. The composition of claim 14, wherein the selectively hydrogenated block copolymer has an order-disorder temperature (ODT) of 140-230° C.

17. An article comprising the composition of claim 14, wherein the article is selected from the group of toys, medical devices, films, tubing, profiles, 3D printed article, sheet, coating, band, strip, molding, tube, foam, tape, fabric, thread, filament, ribbon, fibers, fibrous web, overmolded automotive parts, dipped goods, sheet molded articles, hot melt adhesives, tie-layers, roofing sheets, membranes, tire treads, and tire inner layers.

18. The article of claim 17, wherein the article is formed by injection molding, overmolding, dipping, extrusion, rotomolding, slush molding, fiber spinning, film making, 3D printing or foaming.

19. A composition comprising:
a selectively hydrogenated block copolymer having an S block and an E or $E_1$ block and having the general formula S-E-S, $(S-E_1)_nX$ or mixtures thereof,
wherein:
n has a value of 2 to 6,
X is a coupling agent residue,
the block copolymer has a styrene content of 29 to 37 wt. %, and a solution viscosity of 10 to 80 centipoise (cP) as measured at 25 wt. % toluene and 25° C.; and
wherein prior to hydrogenation
the S block is a polystyrene block,
the E block is a polydiene block, selected from the group consisting of polybutadiene, polyisoprene and mixtures thereof, having a peak molecular weight of from 18,000 to 26,000 g/mol,
the $E_1$ block is a polydiene block, selected from the group consisting of polybutadiene, polyisoprene and mixtures thereof, having a peak molecular weight of from 9,000 to 13,000 g/mol, and
the polydiene blocks have a total vinyl content of 70 to 85%; and
wherein subsequent to hydrogenation
0-10 percent of the styrene double bonds have been hydrogenated; and
wherein the block copolymer contains from 0.1 to 10 wt. % of a functional group selected from fumaric acid, itaconic acid, citraconic acid, acrylic acid, maleic anhydride, itaconic anhydride, citraconic anhydride, and derivatives thereof as a grafted monomer.

20. The composition of claim 19, wherein the selectively hydrogenated block copolymer has an order-disorder temperature (ODT) of less than 230° C.

21. A composition consisting essentially of the selectively hydrogenated block copolymer of claim 1.

22. An article consisting essentially of the selectively hydrogenated block copolymer of claim 1, wherein the article is selected from the group of toys, medical devices, films, tubing, profiles, 3D printed article, sheet, coating, band, strip, molding, tube, foam, tape, fabric, thread, filament, ribbon, fibers, fibrous web, overmolded automotive parts, dipped goods, sheet molded articles, hot melt adhesives, tie-layers, roofing sheets, membranes, tire treads, and tire inner layers.

23. The article of claim 22, wherein the article is formed by injection molding, overmolding, dipping, extrusion, rotomolding, slush molding, fiber spinning, film making, 3D printing or foaming.

24. The composition of claim 14, wherein the composition comprises 0.001 to 90 wt. % of an additive selected from olefin polymers, thermoplastic polyurethane, thermoplastic copolyester, styrene polymers, thermoplastic elastomers, tackifying resins and mixtures thereof.

* * * * *